United States Patent
Morishita et al.

(10) Patent No.: US 12,271,410 B2
(45) Date of Patent: Apr. 8, 2025

(54) LEARNING QUALITY ESTIMATION DEVICE, METHOD, AND PROGRAM

(71) Applicant: NIPPON TELEGRAPH AND TELEPHONE CORPORATION, Tokyo (JP)

(72) Inventors: Makoto Morishita, Tokyo (JP); Jun Suzuki, Tokyo (JP); Masaaki Nagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1158 days.

(21) Appl. No.: 16/975,679

(22) PCT Filed: Feb. 21, 2019

(86) PCT No.: PCT/JP2019/006555
§ 371 (c)(1),
(2) Date: Aug. 25, 2020

(87) PCT Pub. No.: WO2019/167794
PCT Pub. Date: Sep. 6, 2019

(65) Prior Publication Data
US 2020/0410345 A1     Dec. 31, 2020

(30) Foreign Application Priority Data
Feb. 27, 2018 (JP) .................. 2018-033719

(51) Int. Cl.
*G06F 16/33* (2019.01)
*G06F 16/3332* (2025.01)
(Continued)

(52) U.S. Cl.
CPC .......... *G06F 16/3337* (2019.01); *G06F 40/20* (2020.01); *G06F 40/30* (2020.01);
(Continued)

(58) Field of Classification Search
CPC .... G06N 3/0442; G06N 3/044; G06N 3/0455; G06N 3/08; G06N 7/00; G06N 20/00;
(Continued)

(56) References Cited

U.S. PATENT DOCUMENTS 10,248,651 B1 * 4/2019 Fuerstenau ............. G06F 40/51
10,268,684 B1 * 4/2019 Denkowski ............. G06F 40/44
(Continued)

FOREIGN PATENT DOCUMENTS

CN         10294523 A       2/2013

OTHER PUBLICATIONS

Artetxe et al., "Unsupervised Neural Machine Translation" Oct. 30, 2017, arXiv: 1710.11041v1, pp. 1-11. (Year: 2017).*
(Continued)

Primary Examiner — Miranda M Huang
Assistant Examiner — Chase P. Hinckley

(57) ABSTRACT

This disclosure relates to a device, a method, and a program capable of removing erroneous data from learning data used for machine learning used in natural language processing, for example. The method includes storing a forward direction learned model of a discrete series converter. The model is trained based on a plurality of pairs of discrete series of texts. Each pair comprises a first discrete series indicates an input of discrete series. A second discrete series indicates an output of discrete series. The first discrete series and the second discrete series are correctly associated. The method further includes converting the first discrete series to the second discrete series, and generating a quality score using the forward direction learned model, using a second learning pair of discrete series texts including an error in relationship.

20 Claims, 7 Drawing Sheets

(51) Int. Cl.
  *G06F 40/20*    (2020.01)
  *G06F 40/30*    (2020.01)
  *G06F 40/40*    (2020.01)
  *G06N 3/0499*   (2023.01)
  *G06N 3/08*     (2023.01)
  *G06N 20/00*    (2019.01)
  *G06F 40/45*    (2020.01)
  *G06N 3/04*     (2023.01)
  *G06N 3/0455*   (2023.01)

(52) U.S. Cl.
  CPC ........... *G06F 40/40* (2020.01); *G06N 3/0499* (2023.01); *G06N 3/08* (2013.01); *G06N 20/00* (2019.01); *G05B 2219/32018* (2013.01); *G05B 2219/32188* (2013.01); *G05B 2219/32193* (2013.01); *G05B 2219/32194* (2013.01); *G05B 2219/32195* (2020.01); *G06F 40/45* (2020.01); *G06N 3/04* (2013.01); *G06N 3/0455* (2023.01)

(58) Field of Classification Search
  CPC .... G06N 3/0499; G06N 3/04; G06F 16/3337; G06F 40/20; G06F 40/30; G06F 40/40; G06F 40/45; G05B 2219/32018; G05B 2219/32188; G05B 2219/32193–95
  See application file for complete search history.

(56) References Cited

U.S. PATENT DOCUMENTS

| | | | | |
|---|---|---|---|---|
| 10,380,236 | B1* | 8/2019 | Ganu | G06F 40/169 |
| 10,402,495 | B1* | 9/2019 | Rush | G06F 40/30 |
| 10,558,762 | B2* | 2/2020 | Xu | G06F 40/45 |
| 10,733,380 | B2* | 8/2020 | Leidner | G06N 3/044 |
| 11,314,921 | B2* | 4/2022 | Yang | G06F 40/10 |
| 11,482,212 | B2* | 10/2022 | Kim | G10L 15/1815 |
| 11,836,638 | B2* | 12/2023 | Agarwal | G06F 18/2415 |
| 2011/0099133 | A1 | 4/2011 | Chang et al. | |
| 2016/0092437 | A1* | 3/2016 | Endo | G06F 40/58 |
| | | | | 704/4 |
| 2016/0350290 | A1* | 12/2016 | Fujiwara | G06F 40/51 |
| 2017/0323203 | A1* | 11/2017 | Matusov | G06F 16/30 |
| 2018/0089180 | A1* | 3/2018 | Imade | G06F 40/211 |
| 2018/0307679 | A1* | 10/2018 | Duong | G06N 3/082 |
| 2018/0336884 | A1* | 11/2018 | Sriram | G06N 3/044 |
| 2018/0373706 | A1* | 12/2018 | Miklosch | G06F 40/51 |
| 2019/0095961 | A1* | 3/2019 | Wu | G06Q 30/0255 |
| 2019/0130282 | A1* | 5/2019 | Quirk | G06N 3/08 |
| 2019/0213601 | A1* | 7/2019 | Hackman | G06N 3/044 |
| 2019/0251174 | A1* | 8/2019 | Lee | G06F 40/51 |

OTHER PUBLICATIONS

Su et al., "Variational Recurrent Neural Machine Translation" Jan. 16, 2018, arXiv: 1801.05119v1, pp. 1-8. (Year: 2018).*

Neubig, Graham "Neural Machine Translation and Sequence-to-sequence Models: A Survey" Mar. 5, 2017, arXiv: 1703.01619v1, pp. 1-65. (Year: 2017).*

Long et al., "Neural Machine Translation Model with a Large Vocabulary Selected by Branching Entropy" Sep. 6, 2017, arXiv: 1704.04520v6, pp. 1-14. (Year: 2017).*

Cao et al., "Faithful to the Original: Fact Aware Neural Abstractive Summarization" Nov. 13, 2017, arXiv: 1711.04434v1, pp. 1-8. ( Year: 2017).*

Kuremoto et al., "A Sentence Summarizer using Recurrent Neural Network and Attention-Based Encoder" 2017, pp. 245-248. (Year : 2017).*

Zhang et al., "Asynchronous Bidirectional Decoding for Neural Machine Translation" Feb. 3, 2018, arXiv: 1801.05122v2, pp. 1-9. ( Year: 2018).*

Hokamp, Chris, "Ensembling Factored Neural Machine Translation Models for Automatic Post-Editing and Quality Estimation" Jul. 15, 2017, arXiv: 1706.05083v2, pp. 1-8. (Year: 2017).*

Hu et al., "Toward Controlled Generation of Text" Jan. 23, 2018, arXiv: 1703.00955v3, pp. 1-10. (Year: 2018).*

Le et al., "Automatic Quality Estimation for Speech Translation Using Joint ASR and MT Features" Sep. 20, 2016, arXiv: 1609.06049v1, pp. 1-23. (Year: 2016).*

Xiong et al., "Multi-channel Encoder for Neural Machine Translation" Dec. 6, 2017, arXiv: 1712.02109v1, pp. 1-8. (Year: 2017).*

Toral et Way, "What Level of Quality can Neural Machine Translation Attain on Literary Text?" Jan. 15, 2018, arXiv: 1801.04962v1, pp. 1-26. (Year: 2018).*

Martins et al., "Pushing the Limits of Translation Quality Estimation" Jul. 2017, pp. 205-218. (Year: 2017).*

Sutskever, Ilya, et al. "Sequence to Sequence Learning with Neural Networks," Advances in Neural Information Processing Systems 27, Dec. 8, 2014.

Luong, Minh-Thang, et al., "Effective Approaches to Attention-based Neural Machine translation," arXiv:1508.04025v5 [cs.CL] Sep. 20, 2015, Proceedings of the Conference on Empirical Methods in Natural Language Processing.

Imamura, Kenji, et al., "Introduction of Single-Language Corpus to Neural Machine Translation by Pseudo-Source Generation," A collection of papers presented at the 23 Annual Meeting of the Society of Language Processing, Mar. 2017, The Association for Natural Language Processing.

Matsumura, Yukizakura, et al., "Optimization of Neural Machine Translation by Reverse translation," A collection of papers presented at the 23 Annual Meeting of the Society of Language Processing, Mar. 2017, The Association for Natural Language Processing.

* cited by examiner

LEARNING QUALITY ESTIMATION DEVICE, METHOD, AND PROGRAM

This application is a U.S. 371 Application of International Patent Application No. PCT/JP2019/006555, filed on 21 Feb. 2019, which application claims priority to and the benefit of JP Application No. 2018-033719, filed on 27 Feb. 2018, the disclosures of which are hereby incorporated herein by reference in their entireties.

TECHNICAL FIELD

The present invention relates to a learning quality estimation device, a learning quality estimation method, and a program and, more particularly, to a learning quality estimation device, a learning quality estimation method, and a program for estimating quality of learning data used for machine learning such as natural language processing.

BACKGROUND ART

A background art is explained using a case in the natural language processing field as a material. A technique for natural language processing with a computer is considered to be a technique for processing a set of discrete symbols such as superficial characters and words appearing in sentences. For example, an automatic translation system that receives an input of a sentence of a certain language and outputs a sentence of another language is considered. In this system, processing is performed regarding the input and output sentences as word strings (character strings). Accordingly, it can be regarded that processing for converting a discrete series (a symbol string) into another discrete series is performed by a computer in the system. A system to which a language is input and from which a language is output such as a document summarizing system, a dialog system, or a document composition system is considered to be configured by processing for converting a discrete series into another discrete series like the automatic translation system explained above. In this way, in a natural language processing system other than the abovementioned natural language processing system, as long as the system treats a natural language, a target to be treated is a discrete series such as a word, a sentence, or a document. There is a difference in a definition concerning what kind of conversion is performed from an input to an output, however, a framework of processing is the same and the system can result in a case of conversion from a discrete system into a discrete system. Various examples of the conversion cases in the natural language processing are illustrated in FIG. 5.

As explained above, concerning the discrete series-to-discrete series conversion case, a large number of methods have been developed and various methodologies have been established in the natural language processing field. Classically, a human described a conversion rule, regulation, and the like from a series to a series and constructed a conversion method. In recent years, a method of utilizing a machine learning technique for, for example, using correct answer data or using an optimization method has been a mainstream. Recently, among machine learning methods, a method of solving the discrete series-to-discrete series conversion case with a methodology of using a framework of a recurrent neural network, encoding a discrete series into a real number value vector, and decoding the discrete series from the real number value vector has been proposed (see, for example, NPL 1). This method realizes, without using any prior knowledge which is manually made, the conversion from a variable-length series structure into a series structure only by encoding into a fixed-length real number value vector and decoding and it is a significant characteristic of this method. An example of encoding by an encoder and decoding by a decoder is illustrated in FIG. 6.

This "converter from a discrete series to a discrete series based on the recurrent neural network" is herein simply referred to as "discrete series-to-discrete series converter". The discrete series-to-discrete series converter is constructed by a combination of two functions, a discrete system encoder and a discrete system decoder. A fixed-length real number value vector, which is a parameter of the encoder/the decoder, is automatically acquired from learning data. The parameter learning is advanced by preparing, as learning data, a set of ideal pairs of inputs and outputs of the respective converters and performing parameter adjustment such that an input of the learning data can be correctly output.

As one of discrete series-to-discrete series converters, there is an attention-based discrete series-to-discrete series converter (see, for example, NPL 2). With this method, when a decoder weights an output of an encoder with time steps, more highly accurate series conversion can be performed. An example of the attention-based discrete series-to-discrete series converter is illustrated in FIG. 7.

CITATION LIST

Non Patent Literature

[NPL 1] Ilya Sutskever, Oriol Vinyals, and Quoc V Le, "Sequence to Sequence Learning with Neural Networks". Advances in Neural Information Processing Systems 27, 2014.

[NPL 2] Minh-Thang Luong, Hieu Pham and Christopher D. Manning, "Effective Approaches to Attention-based Neural Machine Translation". Proceedings of the Conference on Empirical Methods in Natural Language Processing, 2015.

SUMMARY OF THE INVENTION

Technical Problem

Incidentally, in the natural language processing, the method of learning a converter using learning data and a machine learning technique becomes mainstream as explained above. The learning data here is, for example, in case of a machine translation system, a pair of sentences of two languages representing the same meaning and is, in case of a dialog system, a pair of an input sentence and an output sentence of an ideal dialog system. When such a machine learning technique is used, the learning data in use is based on a correct pair of an input and an output. Possibility of mixing of wrong data in the learning data is not usually considered.

However, in general, these learning data are often mechanically collected. Therefore, wrong data is often mixed in the learning data. Such wrong data adversely affects machine learning and final conversion accuracy is sometimes deteriorated. That is, it is likely that wrong data is mixed in learning data used in the natural language processing. This sometimes adversely affects the machine learning. Therefore, if these wrong data can be removed, it can be expected that the accuracy of the machine learning is further improved.

The present invention has been devised in view of the circumstances described above, and an object of the present invention is to provide a learning quality estimation device, a learning quality estimation method, and a program that can remove wrong data in learning data used for machine learning such as natural language processing.

Means for Solving the Problem

In order to achieve the object, a learning quality estimation device according to a first invention includes: a storing unit storing a forward direction learned model of a discrete series converter, which converts a first discrete series of a discrete series into a second discrete series, learned in advance based on a plurality of first pairs for learning in which the first discrete series indicating an input of the discrete series and the second discrete series indicating an output are in a correct correspondence relation; and a quality-score calculating unit that calculates, concerning a second pair for learning including an input and an output of a discrete series likely to include an error in a correspondence relation, a quality score using the forward direction learned model.

In a learning quality estimation device according to a second invention, in the first invention, the discrete series converter is a neural network and includes: an encoder that converts discrete symbols included in the input into fixed-length vectors and encodes the converted fixed-length vectors of the discrete symbols to obtain a fixed-length vector series; and a decoder that calculates a hidden vector based on the fixed-length vector series obtained by the encoder and obtains an output with respect to the input based on the hidden vector, and the quality-score calculating unit calculates, concerning an output included in the second pair for learning, with, as an input, the fixed-length vector series obtained by the encoder from an input included in the second pair for learning, the quality score using a negative log likelihood at a time when the output is obtained from the decoder based on the fixed-length vector series obtained by the decoder.

In a learning quality estimation device according to a third invention, in the second invention, the quality-score calculating unit outputs, as the quality score, a negative log likelihood per discrete symbol obtained by dividing the negative log likelihood by a number of discrete symbols included in the output.

In a learning quality estimation device according to a fourth invention, in any one of the first to third inventions, the quality-score calculating unit calculates the quality score concerning each of a plurality of second pairs for learning, and the learning quality estimation device further includes a selecting unit that selects a predetermined number of second pairs for learning out of the plurality of second pairs for learning in descending order of quality scores calculated by the quality-score calculating unit.

In a learning quality estimation device according to a fifth invention, in any one of the first to fourth inventions, the storing unit further stores a backward direction learned model of the discrete series converter, which converts the second discrete series of the discrete series into the first discrete series, learned in advance based on the plurality of first pairs for learning, and the quality-score calculating unit calculates the quality score concerning the second pair for learning using each of the forward direction learned model and the backward direction learned model.

On the other hand, in order to achieve the object, a learning quality estimation method according to a sixth invention is a learning quality estimation method by a learning quality estimation device including a storing unit storing a forward direction learned model of a discrete series converter, which converts a first discrete series of a discrete series into a second discrete series, learned in advance based on a plurality of first pairs for learning in which the first discrete series indicating an input of the discrete series and the second discrete series indicating an output are in a correct correspondence relation, the learning quality estimation method including a step in which a quality-score calculating unit calculates, concerning a second pair for learning including an input and an output of a discrete series likely to include an error in a correspondence relation, a quality score using the forward direction learned model.

Further, in order to achieve the object, a program according to a seventh invention causes a computer to function as the quality-score calculating unit included in the learning quality estimation device according to any one of the first to fifth inventions.

Effects of the Invention

As explained above, with the learning quality estimation device, the learning quality estimation method, and a program according to the present invention, it is possible to remove wrong data in learning data for discrete series-to-discrete series conversion such as translation data or dialog data often used in the field of natural language processing or the like. As a result, adverse effect on machine learning due to the wrong data is reduced and accuracy of the machine learning can be improved.

DESCRIPTION OF EMBODIMENTS

An example of a mode for carrying out the present invention is explained in detail below with reference to the drawings.

First Embodiment

In the following explanation in this embodiment, a quality score is given to data for translation learning and selected using the attention-based discrete series-to-discrete series converter described in NPL 2 described above. For the discrete series-to-discrete series converter, various methods (for example, see NPL 3) are conceivable other than the above. In this embodiment, any converter may be used.

[NPL 3] Dzmitry Bandanau, Kyunghyun Cho and Yoshua Bengio, "Neural Machine Translation by Jointly Learning to Align and Translate". Proceedings of the 3rd International Conference on Learning Representations, 2015.

Figure 5:
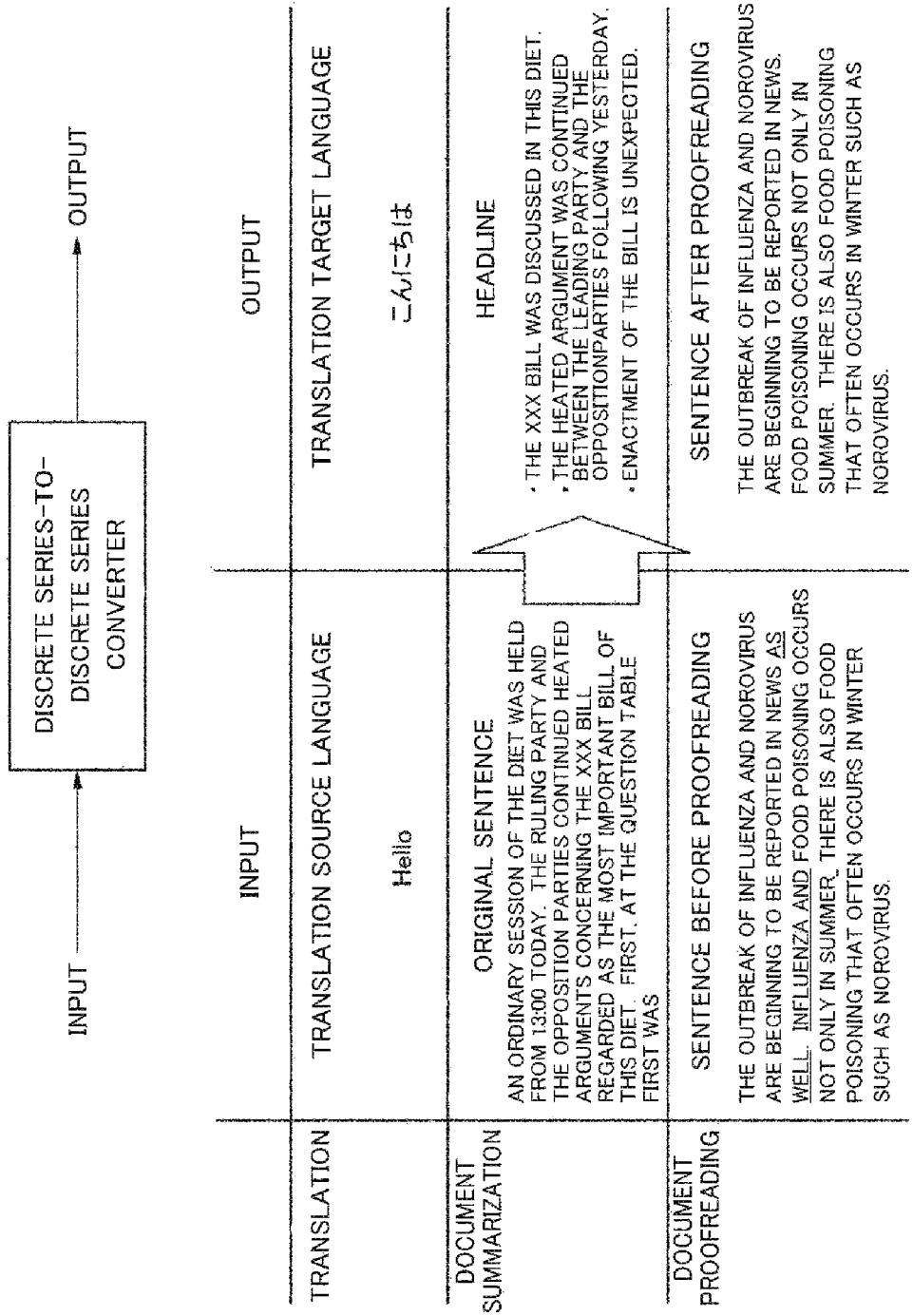
FIG. 5 is a diagram illustrating various example of conversion cases in natural language processing.

Note that, in this embodiment, an input sentence of a translations source language and an output sentence of a translation target language are applied as an example of an input and an output of a discrete series as illustrated in FIG. 5. In this case, a word included in the input sentence and a word included in the output sentence are applied to discrete symbols. Note that an input sentence before document summarization and an output sentence after the document summarization or an input sentence before document proofreading and an output document after the document proofreading may be applied as the input and the output of the discrete series.

First, a definition of a case is explained. A group of sentences of a pair for translation learning including an input sentence and an output sentence not including an error (noise) is represented as (CF, CE) and a group of sentences of a pair for translation learning including an input sentence and an output sentence likely to include an error is represented as (NF, NE). In this embodiment, a learned model of a discrete series-to-discrete series converter is constructed based on the pair for translation learning not including an error. A quality score is given to the pair for translation learning likely to include an error using the constructed learned model of the discrete series-to-discrete series converter. A procedure of processing for giving a quality score according to this embodiment is as explained below.

(Input)

An input of a pair for translation learning likely to include an error is received.

(Preprocessing)

Each of an input sentence and an output sentence of the pair for translation learning is divided into word series using an existing word divider.

(Quality Score Calculation)

A quality score of the output sentence is calculated using a learned model of a discrete series-to-discrete series converter obtained by learning beforehand.

(Repetition)

The procedure described above is repeated for all pairs for translation learning to obtain quality scores for all the pairs for translation learning.

(Selection)

The pairs for translation learning are rearranged based on the obtained quality scores of the pairs for translation learning to select a predetermined number of pairs for translation learning in descending order of the quality scores.

Next, an overview of learning processing performed using the discrete series-to-discrete series converter described in NPL 2 is explained.

Here, the discrete series-to-discrete series converter is learned based on the pair for translation learning not including an error as explained above.

Note that an i-th input sentence is represented as $f_i \in CF$ and an i-th output sentence is represented as $e_i \in CE$. Types of input words are limited to frequently appearing $V_f$ words and types of output words are limited to frequently appearing $V_e$ words. Words not included in the frequently appearing $V_f$ words and the frequently appearing $V_e$ words may be replaced with dedicated tokens as unknown words.

Figure 7:
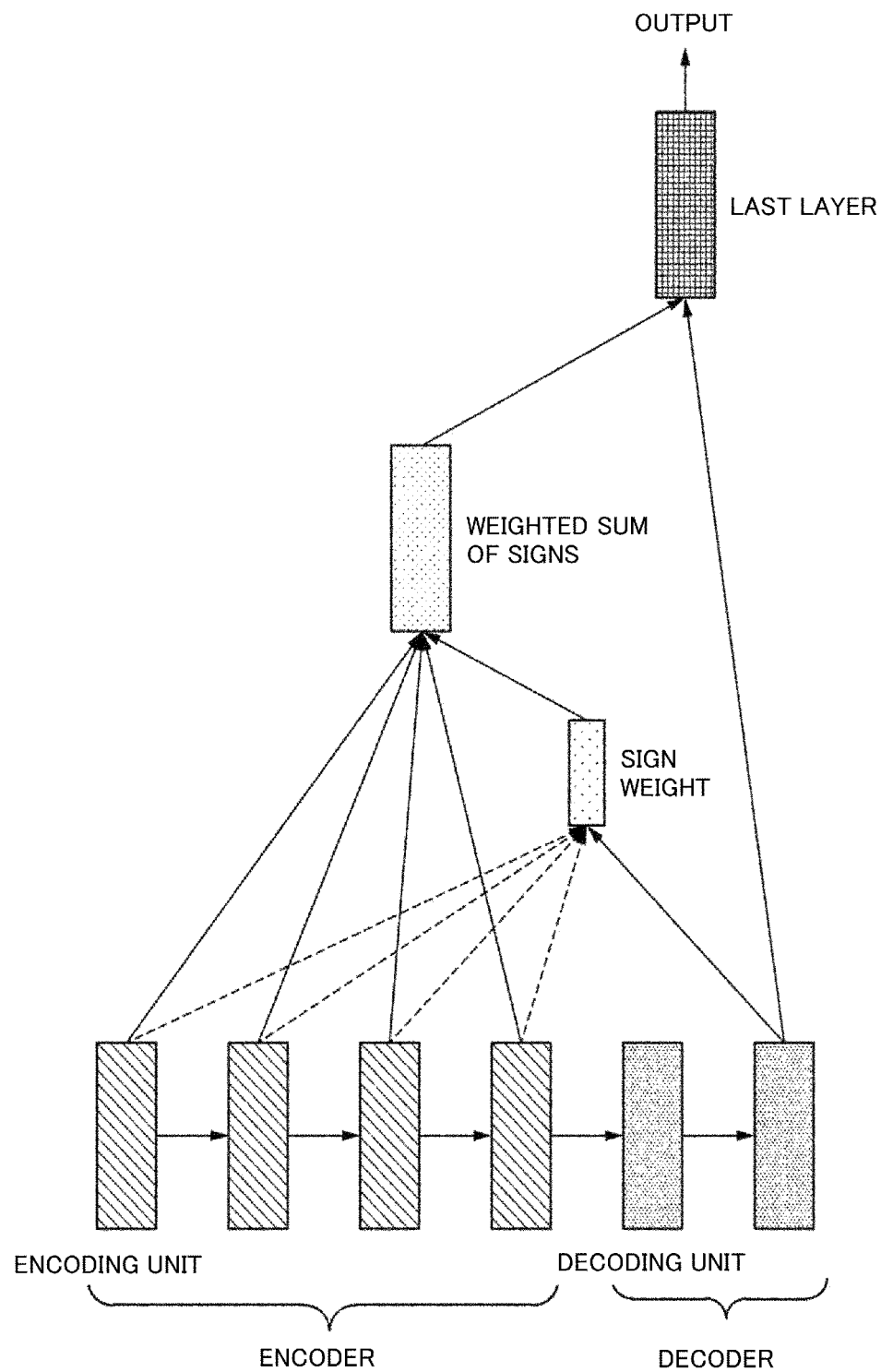
FIG. 7 is a diagram illustrating an example of an attention-based discrete series-to-discrete series converter.

The discrete series-to-discrete series converter includes an encoder and a decoder as illustrated in FIG. 7. The encoder converts words included in the input sentence $f_i$ into fixed-length vectors $e_s$. Thereafter, the encoder encodes the converted fixed-length vectors $e_s$ of the words respectively into fixed-length vector series $h_s$.

The decoder calculates a hidden layer (a hidden vector) $h_t$ based on the fixed-length vector series $h_s$ finally obtained by the encoder and decodes the output sentence $e_i$ based on the fixed-length vector series $h_s$ and the hidden layer $h_t$. At that time, the decoder calculates, according to Expressions (1) to (4) described below, weight $a_t$ and a weighted sum $c_t$ to the fixed-length vector series $h_s$ output by the encoder at time steps. Subsequently, the decoder calculates $$\tilde{h}_t \quad \text{[Formula 1]}$$

from $c_t$ and $h_t$ according to Expression (5). Finally, the decoder predicts a probability distribution of output words using Expression (6) and uses the probability distribution for decoding. Note that these expressions are described in NPL 2.

[Formula 2]

$$a_t = \text{align}(h_t, \bar{h}_s) \quad (1)$$

$$= \frac{\exp(\text{score}(h_t, \bar{h}_s))}{\sum_{s'} \exp(\text{score}(h_t, \bar{h}_{s'}))} \quad (2)$$

$$\text{score}(h_t, h_s) = h_t^T W_a \bar{h}_s \quad (3)$$

$$c_t = \sum_{j=1}^{|f_i|} a_{tj} h_{sj} \quad (4)$$

$$\bar{h}_t = \tanh(W_c[c_t; h_t]) \quad (5)$$

$$p(e_{i,t} \mid e_{i,<t}, f_i) = \text{softmax}(W_s \tilde{h}_t) \quad (6)$$

Here, $$\bar{h}_s \quad \text{[Formula 3]}$$

represents the fixed-length vector series output by the encoder at the time steps. The decoder performs weighting on outputs of the encoder at the time steps based on the vector series.

$$h_t^T \quad \text{[Formula 4]}$$

represents transposition of the hidden layer $h_t$.

$$W_a \quad \text{[Formula 5]}$$

represents a model parameter.

$$\tilde{h}_t \quad \text{[Formula 6]}$$

represents a fixed-length vector series output by the decoder at time step t.

$$W_s \quad \text{[Formula 7]}$$

represents a model parameter.

$$W_c \quad \text{[Formula 8]}$$

represents a model parameter.

$$e_{i,t} \quad \text{[Formula 9]}$$

represents a t-th word of the output sentence $e_i$.

Various configurations are conceivable on the inside of the encoder. The encoder is constructed by a long and short term storage memory (LSTM) herein. However, the encoder may have other configurations such as a recurrent neural network (RNN) and a gated recurrent unit (GRU). A parameter $\theta_{fe}$ in the encoder and the decoder is determined using the pair for translation learning (CF, CE) not including an error as explained above. The parameter $\theta_{fe}$ is fixed after learning. This parameter $\theta_{fe}$ determines accuracy of encoding.

A parameter learning method may be basically the same as the conventional series structure-to-series structure converter. An input sentence of a pair for learning is input to the discrete series-to-discrete series converter and an output sentence is obtained based on parameters of the encoder and the decoder. At that time, if the same output sentence as an output sentence (correct answer data) of the pair for learning is obtained, it is considered that the present parameters are successfully adjusted. On the other hand, if the output sentence is not the same as the correct answer data, processing for adjusting the parameters in a direction in which a correct answer is obtained is performed. Finally, a parameter search is performed in the direction in which the correct answer can be obtained in all pairs for learning to adjust the parameters.

Next, the configuration of a learning quality estimation device according to the first embodiment is explained with reference to FIG. 1

Figure 1:
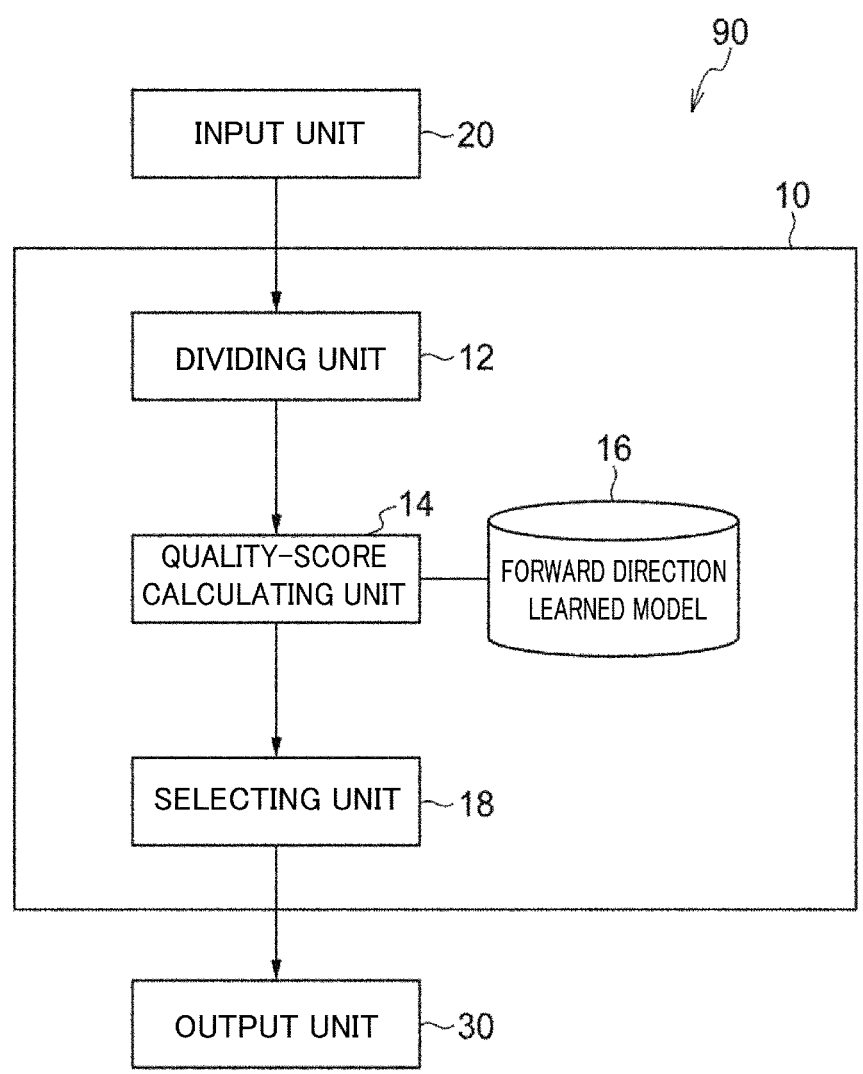
FIG. 1 is a block diagram illustrating an example of a functional configuration of a learning quality estimation device according to a first embodiment.

FIG. 1 is a block diagram illustrating an example of a functional configuration of a learning quality estimation device 90 according to the first embodiment.

As illustrated in FIG. 1, the learning quality estimation device 90 according to this embodiment includes, in terms of functions, a computing unit 10, an input unit 20, and an output unit 30.

The learning quality estimation device 90 according to this embodiment is electrically configured as a computer including a CPU (Central Processing Unit), a RAM (Random Access Memory), a ROM (Read Only Memory), and an HDD (Hard Disk Drive). A learning quality estimation program according to this embodiment is stored in the ROM. Note that the learning quality estimation program may be stored in the HDD.

The learning quality estimation program may be installed in, for example, the learning quality estimation device 90 in advance. This learning quality estimation program may be realized by being stored in a nonvolatile storage medium or distributed via a network and installed in the learning quality estimation device 90 as appropriate. Note that examples of the nonvolatile storage medium include a CD-ROM (Compact Disc Read Only Memory), a magneto-optical disk, a DVD-ROM (Digital Versatile Disc Read Only Memory), a flash memory, and a memory card.

The CPU functions as the computing unit 10, the input unit 20, and the output unit 30 by reading and executing the learning quality estimation program stored in the ROM.

The computing unit 10 according to this embodiment is configured by a dividing unit 12, a quality-score calculating unit 14, a storing unit 16, and a selecting unit 18.

In the storing unit 16, a forward direction learned model of a discrete series-to-discrete series converter (hereinafter simply referred to as discrete series converter), which converts an input sentence of a discrete series into an output sentence, learned in advance based on a plurality of first pairs for learning in which the input sentence and the output sentence of the discrete series are in a correct correspondence relation. That is, the forward direction learned model of the discrete series converter is generated based on the parameter $\theta_{fe}$ indicated by a fixed-length vector obtained by machine learning of the discrete series converter in advance with the plurality of first pairs for learning as an input. This parameter $\theta_{fe}$ is used for conversion of a discrete series from the input sentence to the output sentence by the discrete series converter. Note that the input sentence is an example of a first discrete series and the output sentence is an example of a second discrete series.

The input unit 20 according to this embodiment receives an input of a group of sentences formed by a plurality of second pairs for learning including input sentences and output sentences likely to include an error in a correspondence relation.

The dividing unit 12 according to this embodiment divides each of the input sentences and the output sentences included in the pairs of the plurality of second pairs for learning, the input of which is received by the input unit 20, into word series using an existing word divider.

The quality-score calculating unit 14 according to this embodiment calculates, with, as an input, the plurality of second pairs of learning divided into the word series by the dividing unit 12, quality scores for the pairs of the plurality of second pairs for learning using the forward direction learned model stored in the storing unit 16.

The selecting unit 18 according to this embodiment selects, out of the plurality of second pairs for learning, a predetermined number of second pairs for learning in descending order of the quality scores calculated by the quality-score calculating unit 14. A predetermined number n (n is an integer equal to or larger than 1) can be set as appropriate by a user.

The output unit 30 according to this embodiment outputs the n second pairs for learning selected by the selecting unit 18. As an output destination of the output unit 30, a display unit such as a liquid crystal display (LCD) or an organic EL (Electro Luminescence) display is applied.

Next, a specific configuration of the quality-score calculating unit 14 according to this embodiment is explained with reference to FIG. 2.

Figure 2:
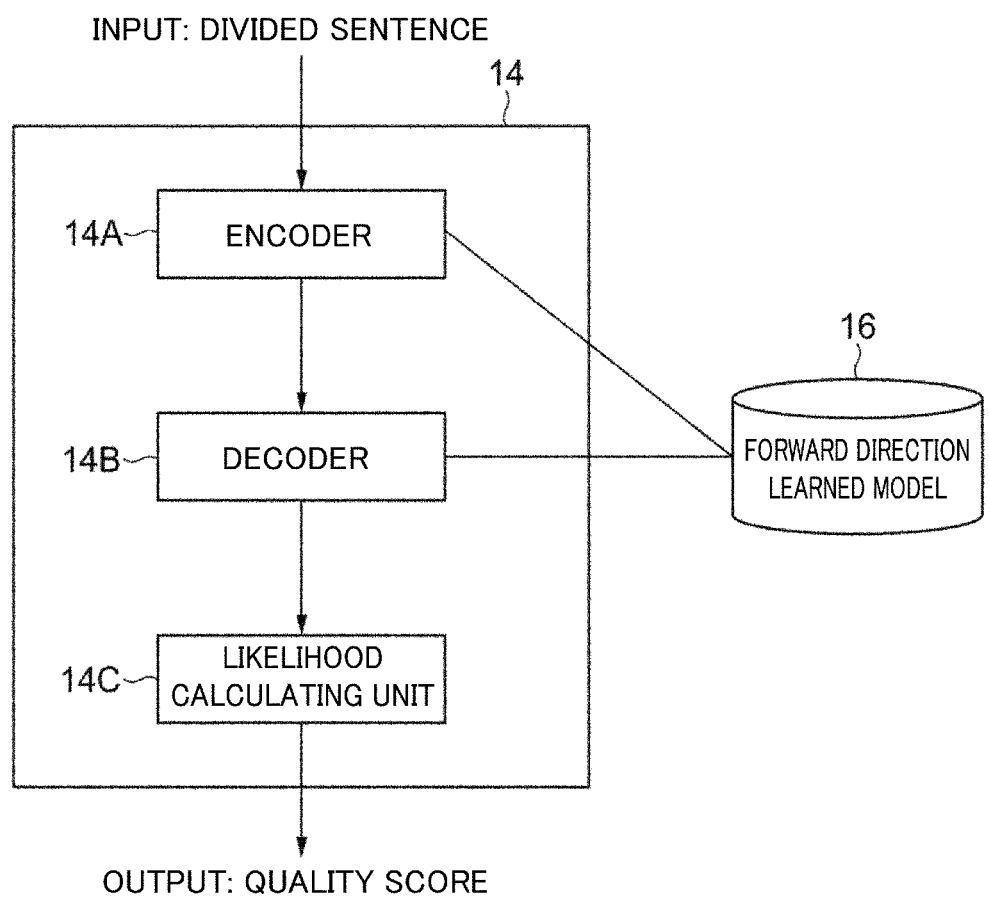
FIG. 2 is a block diagram illustrating an example of the configuration of a quality-score calculating unit according to the embodiment.

FIG. 2 is a block diagram illustrating an example of the configuration of the quality-score calculating unit 14 according to this embodiment.

As illustrated in FIG. 2, the quality-score calculating unit 14 according to this embodiment includes an encoder 14A, a decoder 14B, and a likelihood calculating unit 14C. Note that the encoder 14A and the decoder 14B configure the discrete series converter.

The encoder 14A according to this embodiment converts words of an input sentence included in a second pair for learning into fixed-length vectors using the forward direction learned model stored in the storing unit 16 and encodes the converted fixed-length vectors of the words to obtain each of fixed-length vector series.

The decoder 14B according to this embodiment calculates a hidden vector based on the fixed-length vector series obtained by the encoder 14A and obtains an output sentence with respect to the input sentence based on each of the fixed-length vector series, the hidden vector, and weight to each of the fixed-length vector series.

The likelihood calculating unit 14C according to this embodiment calculates, concerning the output sentence included in the second pair for learning, from the input sentence included in the second pair for learning, with, as an input, the fixed length vector series obtained by the encoder 14A, based on the fixed-length vector series obtained by the decoder 14B, a negative log likelihood at the time when the output sentence is obtained from the decoder 14B. The likelihood calculating unit 14C outputs, as a quality score, a negative log likelihood per word obtained by dividing the negative log likelihood of the output sentence included in the second pair for learning by the number of words of the output sentence.

That is, when the input sentence of the second pair for learning is represented as $f_i \in NF$, the output sentence is represented as $e_i \in NE$, the fixed-length vector series is represented as $$\tilde{h}_{t'} \quad \text{[Formula 10]}$$

a fixed-length vector series obtained by encoding the input sentence $f_i$ with the encoder is represented as $h_s$, a parameter used for conversion of a discrete series from the input sentence into the output sentence is represented as $\theta_{fe}$, and a conditional probability is represented as p, with respect to $e_i$, based on the fixed-length vector series $$\tilde{h}_t \quad \text{[Formula 11]}$$

obtained by the decoder 14B from the fixed-length vector series $h_s$, a negative log likelihood J at the time when the output sentence $e_i$ is obtained from the decoder 14B is calculated according to Expression (7) and Expression (8) described below.

[Formula 12]

$$J = -\log p(e_i \mid f_i) \quad (7)$$
$$\simeq -\log p(e_i \mid \tilde{h}_t; \theta_{fe}) \quad (8)$$

Further, when the number of words of the output sentence $e_i$ is represented as $|e_i|$, the negative log likelihood J obtained as described above is divided by the number of words $|e_i|$ of the output sentence $e_i$. By performing standardization using the number of words in this way, a difference between a long sentence and a short sentence can be reflected on a quality score. In this case, a log likelihood $J_w$ per word is calculated by Expression (9) described below. Note that the conditional probability p of Expression (8) can be calculated by calculating output probabilities of words constituting $e_i$ based on, for example, the probability distribution of Expression (6) and calculating a product of the output probabilities.

[Formula 13]

$$J_w = \frac{J}{|e_i|} \quad (9)$$

The log likelihood $J_w$ per word obtained as explained above is output as a quality score of the second pair for learning. The quality score is calculated for all pairs included in the group of sentences (NF, NE) including the plurality of second pairs for learning.

Further, rearrangement of the plurality of second pairs for learning is performed based on quality scores obtained for all of the plurality of second pairs for learning. High score n (n≥1) second pairs for learning after the rearrangement are used for machine learning.

Figure 6:
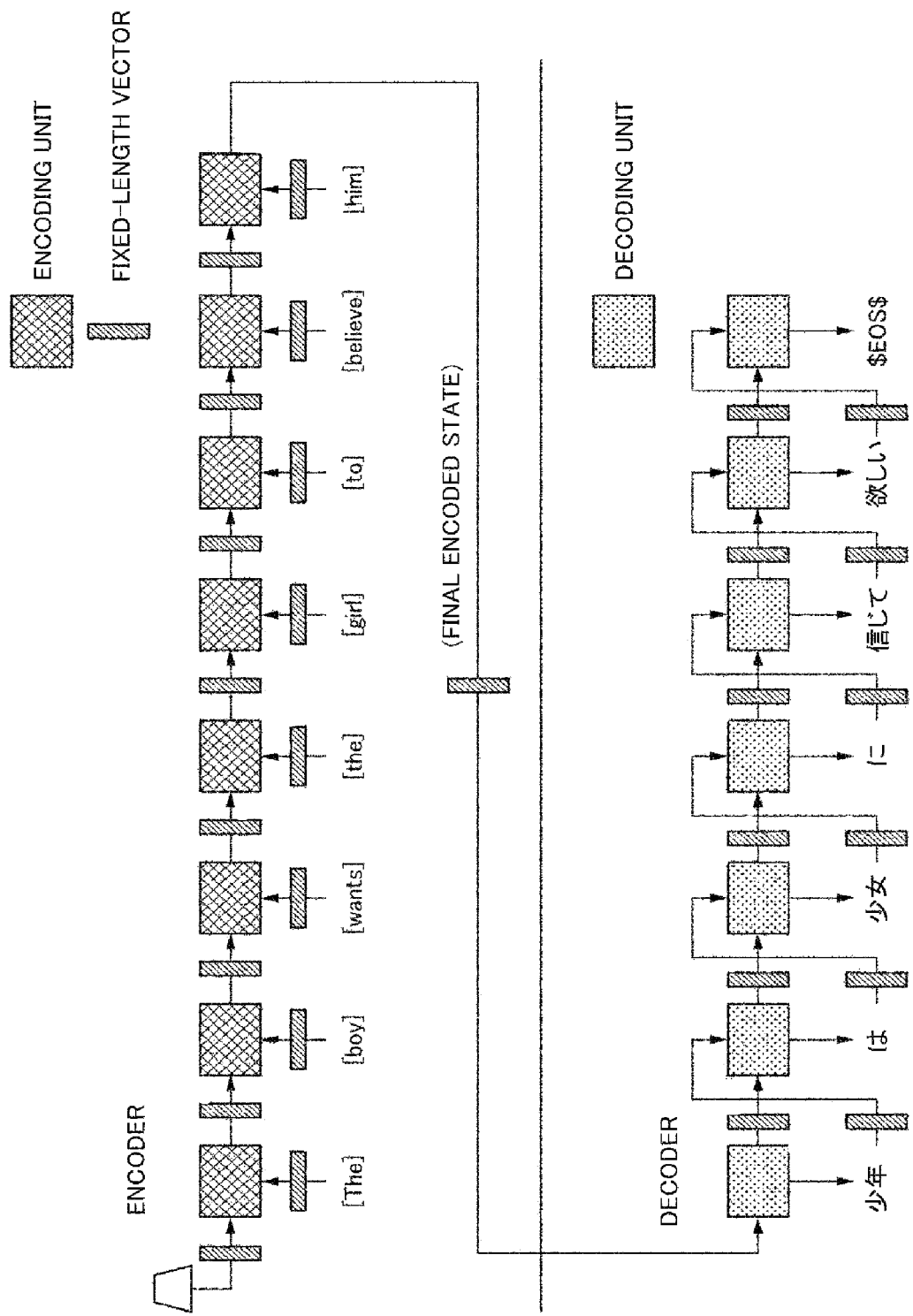
FIG. 6 is a diagram illustrating an example of encoding by an encoder and decoding by a decoder.

Note that, in the above explanation, as an example of the discrete series converter, the attention-based discrete series-to-discrete series converter illustrated in FIG. 7 is applied. However, a general discrete series-to-discrete series converter illustrated in FIG. 6 may be applied. In this case, the encoder 14A converts the words of the input sentence included in the second pair for learning into fixed-length vectors using the forward direction learned model stored in the storing unit 16 and encodes the converted fixed-length vectors of the words to obtain a fixed-length vector series.

The decoder 14B calculates a hidden vector based on the fixed-length vector series obtained by the encoder 14A and obtains an output sentence with respect to the input sentence based on the calculated hidden vector.

Next, action of the learning quality estimation device 10 according to the first embodiment is explained with reference to FIG. 3. Note that FIG. 3 is a flowchart illustrating an example of a flow of processing of the learning quality estimation program according to the first embodiment.

Figure 3:
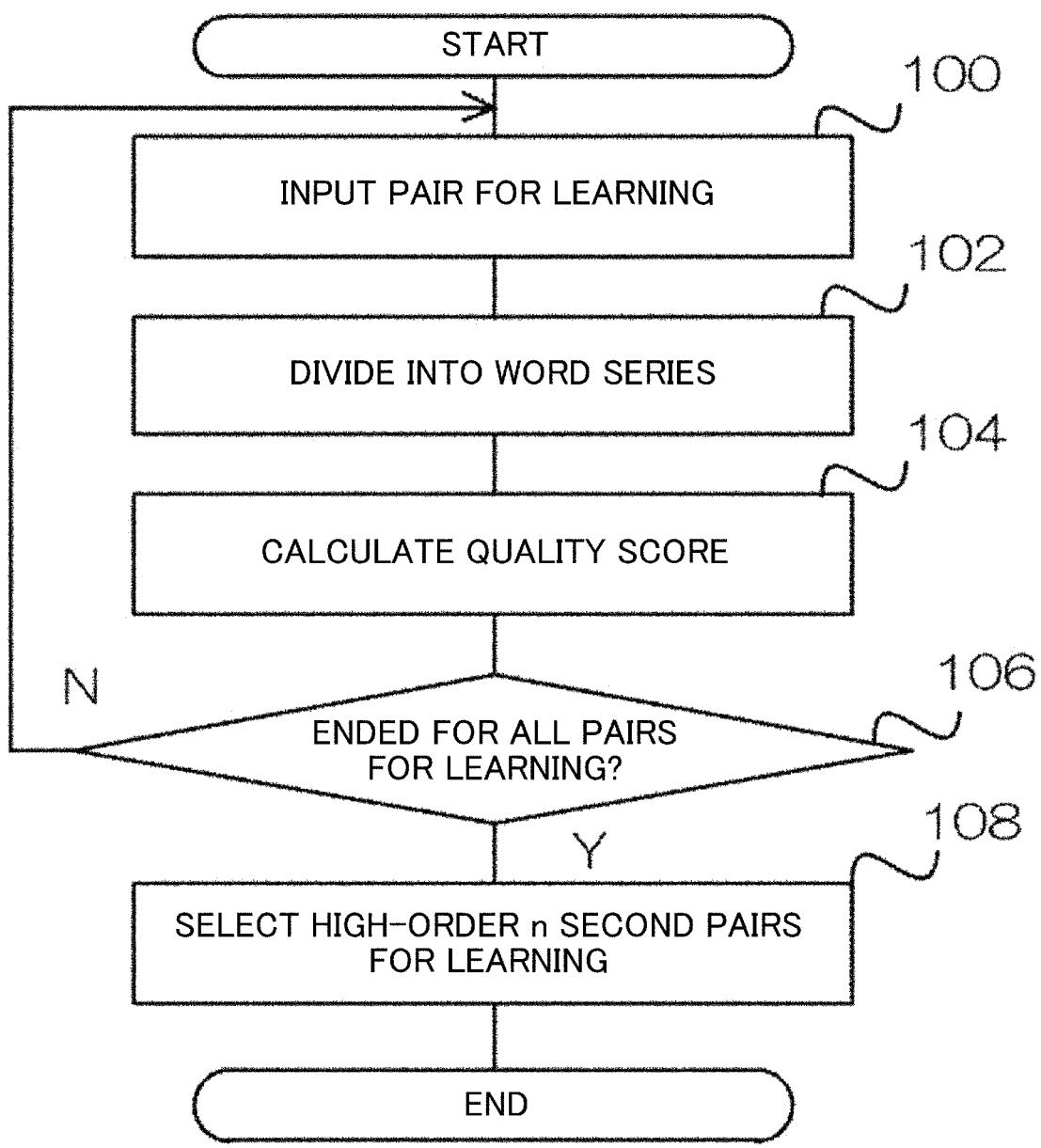
FIG. 3 is a flowchart illustrating an example of a flow of processing of a learning quality estimation program according to a first embodiment.

In step 100 in FIG. 3, the input unit 20 receives an input of a second pair for learning including an input sentence and an output sentence likely to include an error.

In step 102, the dividing unit 12 divides each of the input sentence and the output sentence included in the second pair for learning, the input of which is received in step 100, into word series.

In step 104, the quality-score calculating unit 14 calculates, concerning the second pair for learning divided into the word series in step 102, using the forward direction learned model stored in the storing unit 16, a likelihood of the output sentence included in the second pair for learning and calculates a quality score from the calculated likelihood.

In step 106, the quality-score calculating unit 14 determines whether the quality score calculated in step 104 is obtained for all of second pairs for learning. When it is determined that the quality score is obtained (in the case of affirmative determination), the processing shifts to step 108. When it is determined that the quality score is not obtained (in the case of negative determination), the processing returns to step 100 and is repeated.

In step 108, the selecting unit 18 selects n second pairs for learning in descending order of the quality scores calculated by the processing. The series of processing by this learning quality estimation program is ended.

In this way, according to this embodiment, it is possible to remove a wrong pair for learning by calculating, using a learned model of the discrete series converter, a quality score for a pair for learning likely to include an error. Consequently, it is possible to reduce an adverse effect on machine learning due to the wrong pair for learning, improve accuracy of the machine learning, and further reduce a time required for the machine learning.

Second Embodiment

In the first embodiment, the parameter $\theta_{fe}$ in the forward direction from the input sentence to the output sentence of the discrete series converter is learned and used using the group of sentences (CF, CE) of the first pair for learning not including an error. In this embodiment, a parameter $\theta_{ef}$ in the backward direction from the output sentence to the input sentence of the discrete series converter is also learned and used. Consequently, it is possible to achieve further improvement. In this case, for example, a sum of quality scores $J_w$ obtained in both the directions can be calculated and uses for selection.

Figure 4:
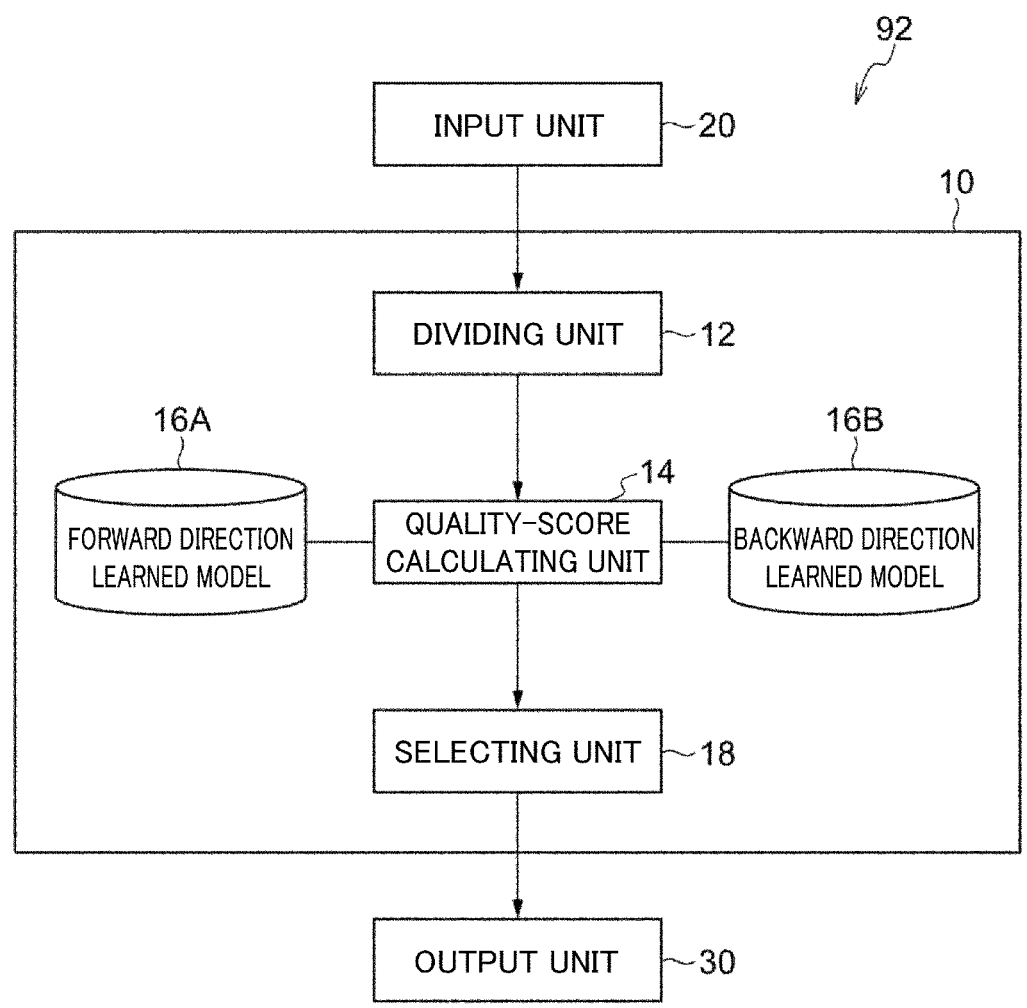
FIG. 4 is a block diagram illustrating an example of a functional configuration of a learning quality estimation device according to a second embodiment.

FIG. 4 is a block diagram illustrating an example of a functional configuration of a learning quality estimation device 92 according to the second embodiment.

As illustrated in FIG. 4, the learning quality estimation device 92 according to this embodiment includes, in terms of functions, the computing unit 10, the input unit 20, and the output unit 30. Note that components having the same functions as the functions of the learning quality estimation device 90 according to the first embodiment are denoted by the same reference numerals and signs and repeated explanation of the components is omitted.

In a storing unit 16A, as in the first embodiment, a forward direction learned model of a discrete series converter, which converts an input sentence of a discrete series into an output sentence, learned in advance based on a plurality of first pairs for learning is stored. In a storing unit 16B, a backward direction learned model of a discrete series converter, which converts an input sentence of a discrete series into an output sentence, learned in advance based on the plurality of first pairs for learning is stored. This backward direction learned model of the discrete series converter is generated based on parameters used for conversion of the discrete series from the output sentence into the input sentence by the discrete series converter. Note that the storing unit 16A and the storing unit 16B may be configured as one storing unit.

The quality-score calculating unit 14 according to this embodiment calculates, concerning a second pair for learning, a quality score using each of the forward direction learned model and the backward direction learned model. Specifically, the quality-score calculating unit 14 calculates, with a plurality of second pairs for learning as an input, using the forward direction learned model stored in the storing unit 16A, quality stores of output sentences included in pairs of the plurality of second pairs for learning and further calculates, using the backward direction learned model stored in the storing unit 16B, quality scores of input sentences included in pairs of the plurality of second pairs.

Here, like the quality-score calculating unit 14 illustrated in FIG. 2, the quality-score calculating unit 14 according to this embodiment includes the encoder 14A, the decoder 14B, and the likelihood calculating unit 14C.

The encoder 14A according to this embodiment converts words of an input sentence included in a second pair for learning into fixed-length vectors using the forward direction learned model stored in the storing unit 16A and encodes the converted fixed-length vectors of the words to obtain each of fixed-length vector series. The encoder 14A converts words of an output sentence included in the second pair for learning into fixed-length vectors using the backward direction learned model stored in the storing unit 16B and encodes the converted fixed-length vectors of the words to obtain each of fixed-length vector series.

The decoder 14B according to this embodiment calculates a hidden vector based on the fixed-length vector series obtained by the encoder 14A and obtains an output sentence with respect to the input sentence based on each of the fixed-length vector series, the hidden vector, and weight to each of the fixed-length vector series. The decoder 14B calculates a hidden vector based on the fixed-length vector series obtained by the encoder 14A and obtains an input sentence with respect to the output sentence based on each of the fixed-length vector series, the hidden vector, and weight to each of the fixed-length vector series.

The likelihood calculating unit 14C according to this embodiment calculates, concerning the output sentence included in the second pair for learning, from the input sentence included in the second pair for learning, with, as an input, the fixed length vector series obtained by the encoder 14A, based on the fixed-length vector series obtained by the decoder 14B, a negative log likelihood at the time when the output sentence is obtained from the decoder 14B. Specifically, the likelihood calculating unit 14C calculates the negative log likelihood using Expression (7) and Expression (8) described above. The likelihood calculating unit 14C outputs, as a quality score in the forward direction, a negative log likelihood per word obtained by dividing the negative log likelihood of the output sentence included in the second pair for learning by the number of words of the output sentence. The likelihood calculating unit 14C calculates, concerning the input sentence included in the second pair for learning, from the output sentence included in the second pair for learning, with, as an input, the fixed length vector series obtained by the encoder 14A, based on the fixed-length vector series obtained by the decoder 14B, a negative log likelihood at the time when the input sentence is obtained from the decoder 14B. In this case, the relation between the input sentence and the output sentence only has to be reversed in Expression (7) and Expression (8) described above. The likelihood calculating unit 14C outputs, as a quality score in the backward direction, a negative log likelihood per word obtained by dividing the negative log likelihood of the input sentence included in the second pair for learning by the number of words of the input sentence.

The selecting unit 18 according to this embodiment selects, out of the plurality of second pairs for learning, a predetermined number of second pairs for learning in descending order of the quality scores calculated by the quality-score calculating unit 14. Note that, in this embodiment, a sum of the quality score in the forward direction obtained when the forward direction learned model is used and the quality score in the backward direction obtained when the backward direction learned model is used is applied as the quality score.

In this way, according to this embodiment, using the learned models concerning both the directions of the forward direction from the input sentence to the output sentence and the backward direction from the output sentence to the input sentence, the quality scores are calculated from both the directions concerning the pair for learning likely to include an error. Consequently, it is possible to more accurately remove a wrong pair for learning.

As explained above, in general, it is premised that wrong data is not mixed in learning data of a discrete series-to-discrete series converter used in natural language processing. However, in reality, in many cases, wrong data is mixed and sometimes adversely affects machine learning.

On the other hand, the quality of the learning data can be estimated by using the embodiments explained above. The wrong data adversely affecting the machine learning can be removed by selecting the learning data based on the quality. Therefore, it is possible to improve learning accuracy of the machine learning by applying the embodiments.

The learning quality estimation devices are illustrated and explained as the embodiments above. The embodiments may be a form of a program for causing a computer to function as the units included in the learning quality estimation device. The embodiments may be a form of a computer-readable storage medium storing the program.

Besides, the configurations of the learning quality estimation devices explained in the embodiments are examples and may be changed according to a situation in a range not departing from the gist.

The flows of the programs explained in the embodiments are also examples. Unnecessary steps may be deleted, new steps may be added, and the processing order may be changed in a range not departing from the gist.

In the explanation in the embodiments, by executing the programs, the processing according to the embodiments is realized by the software configuration using the computer. However, the embodiments are not limited to this. The embodiments may be realized by, for example, a hardware configuration or a combination of the hardware configuration and the software configuration.

REFERENCE SIGNS LIST

10 Computing unit
12 Dividing unit
14 Quality-score calculating unit
14A Encoder
14B Decoder
14C Likelihood calculating unit
16, 16A, 16B Storing unit
18 Selecting unit
20 Input unit
30 Output unit
90, 92 Learning quality estimation device

The invention claimed is:

1. A computer-implemented method for evaluating aspects of discrete series of texts, the method comprising:
receiving a set of pairs of discrete series of texts for learning, wherein each pair comprises a first discrete series of input data and a second discrete series of output data, and wherein the first discrete series of input data and the second discrete series of output data are based on a correct relationship without noise;
generating, based on training, a forward learning model as training of the forward learning model using the set of pairs of discrete series of tests for learning as first training data, wherein the forward learning model, after being trained, converts the first discrete model of input data into the second discrete series of output data according to the correct relationship;
receiving an erroneous pair of discrete series of texts of a plurality of erroneous pairs of discrete series of texts for learning, wherein the erroneous pair of discrete series of texts comprises a third discrete series of input data and a fourth discrete series of output data, and wherein the third discrete series of input data and the fourth discrete series of output data have a likelihood of being based on an erroneous relationship with noise;
determining, using the generated forward learning model, a quality-score for each erroneous pair of discrete series of texts of the plurality of erroneous pairs of discrete series of texts according to the likelihood of being based an erroneous relationship with noise;
ranking said each erroneous pair of discrete series of texts according to the quality-score;
generating, based on the plurality of erroneous pairs of discrete series of texts, second training data by removing at least the ranked said each erroneous pair of discrete series of texts for learning according to the quality-score; and
updating the forward learning model as iterative training of the forward learning model using second training data.

2. The computer-implemented method of claim 1, the method further comprising:
converting, using a neural network, one or more discrete symbols in the third discrete series of input data of the erroneous pair of discrete series of texts into one or more fixed-length vectors;
generating a fixed-length vector series based on encoding the converted one or more fixed-length vectors of the one or more discrete symbols in the third discrete series of input data;
determining, based on the generated fixed-length vector series, a hidden vector;
generating, based on the third discrete series of input data using the hidden vector, a fifth discrete series of output data;
determining, using a negative log-likelihood of the generated fifth discrete series of output data associated with the generated fixed-length vector series, the quality-score for the fourth discrete series of output data; and
providing the quality-score for excluding, based on the quality-score, the erroneous pair of discrete series of texts for training the forward learning model.

3. The computer-implemented method of claim 1, the method further comprises:
determining a plurality of quality-scores for the plurality of the erroneous pairs; and
selecting, based on a descending order of the determined plurality of quality-scores, a predetermined number of the erroneous pairs of discrete series of texts from the plurality of the erroneous pairs of discrete series of texts.

4. The computer-implemented method of claim 1, the method further comprising:
generating, based on training, a reverse learning model for converting the second discrete model of input data into the first discrete series of output data; and
determining, using both of the generated forward learning model and the generated reverse learning model, the quality-score for the erroneous pair of discrete series of texts.

5. The computer-implemented method of claim 1, wherein the first discrete series of input data is based on a first language, wherein the second discrete series of output data is based on a second language, and the first language and the second language are distinct.

6. The computer-implemented method of claim 1, wherein the first discrete series of input data is a set of texts in a document, and wherein the second discrete series of output data is a summary of the document.

7. The computer-implemented method of claim 2, wherein the quality-score for the fourth discrete series of output data relates to a negative log-likelihood per discrete symbol, and wherein the negative log-likelihood per discrete symbol is based on dividing the negative log-likelihood of the generated fifth discrete series of output data by a number of discrete symbols included in the generated fifth discrete series of output data.

8. A system for evaluating aspects of discrete series of texts, the system comprises:
a processor; and
a memory storing computer-executable instructions that when executed by the processor cause the system to:
receive a set of pairs of discrete series of texts for learning, wherein each pair comprises a first discrete series of input data and a second discrete series of output data, and wherein the first discrete series of input data and the second discrete series of output data are based on a correct relationship without noise;
generate, based on training, a forward learning model as training of the forward learning model using the set of pairs of discrete series of tests for learning as first training data, wherein the forward learning model, after being trained, converts the first discrete model of input data into the second discrete series of output data according to the correct relationship;
receive an erroneous pair of discrete series of texts of a plurality of erroneous pairs of discrete series of texts for learning, wherein the erroneous pair of discrete series of texts comprises a third discrete series of input data and a fourth discrete series of output data, and wherein the third discrete series of
input data and the fourth discrete series of output
data have a likelihood of being based on an erroneous relationship with noise;
determine, using the generated forward learning model, a quality-score for each erroneous pair of discrete series of texts of the plurality of erroneous pairs of discrete series of texts according to the likelihood of being based an erroneous relationship with noise;
rank said each erroneous pair of discrete series of texts according to the quality-score;
generate, based on the plurality of erroneous pairs of discrete series of texts, second training data by removing at least the ranked said each erroneous pair of discrete series of texts for learning according to the quality-score; and
update the forward learning model as iterative training of the forward learning model using second training data.

9. The system of claim 8, the computer-executable instructions when executed further causing the system to:
convert, using a neural network, one or more discrete symbols in the third discrete series of input data of the erroneous pair of discrete series of texts into one or more fixed-length vectors;
generate a fixed-length vector series based on encoding the converted one or more fixed-length vectors of the one or more discrete symbols in the third discrete series of input data;
determine, based on the generated fixed-length vector series, a hidden vector;
generate, based on the third discrete series of input data using the hidden vector, a fifth discrete series of output data;
determine, using a negative log-likelihood of the generated fifth discrete series of output data associated with the generated fixed-length vector series, the quality-score for the fourth discrete series of output data; and
provide the quality-score for excluding, based on the quality-score, the erroneous pair of discrete series of texts for training the forward learning model.

10. The system of claim 8, the computer-executable instructions when executed further causing the system to:
determine a plurality of quality-scores for the plurality of erroneous pairs; and
select, based on a descending order of the determined plurality of quality-scores, a predetermined number of the erroneous pairs of discrete series of texts from the plurality of erroneous pairs of discrete series of texts.

11. The system of claim 8, the computer-executable instructions when executed further causing the system to:
generate, based on training, a reverse learning model for converting the second discrete model of input data into the first discrete series of output data; and
determine, using both of the generated forward learning model and the generated reverse learning model, the quality-score for the erroneous pair of discrete series of texts.

12. The system of claim 8, wherein the first discrete series of input data is based on a first language, wherein the second discrete series of output data is based on a second language, and the first language and the second language are distinct.

13. The system of claim 8, wherein the first discrete series of input data is a set of texts in a document, and wherein the second discrete series of output data is a summary of the document.

14. The system of claim 9, wherein the quality-score for the fourth discrete series of output data relates to a negative log-likelihood per discrete symbol, and wherein the negative log-likelihood per discrete symbol is based on dividing the negative log-likelihood of the generated fifth discrete series of output data by a number of discrete symbols included in the generated fifth discrete series of output data.

15. A computer-readable non-transitory recording medium storing computer-executable instructions that when executed by a processor cause a computer system to:
receive a set of pairs of discrete series of texts for learning, wherein each pair comprises a first discrete series of input data and a second discrete series of output data, and wherein the first discrete series of input data and the second discrete series of output data are based on a correct relationship without noise;
generate, based on training, a forward learning model as training of the forward learning model using the set of pairs of discrete series of tests for learning as first training data, wherein the forward learning model, after being trained, converts the first discrete model of input data into the second discrete series of output data according to the correct relationship;
receive an erroneous pair of discrete series of texts of a plurality of erroneous pairs of discrete series of texts for learning, wherein the erroneous pair of discrete series of texts comprises a third discrete series of input data and a fourth discrete series of output data, and wherein the third discrete series of input data and the fourth discrete series of output data have a likelihood of being based on an erroneous relationship with noise;
determine, using the generated forward learning model, a quality-score for each erroneous pair of discrete series of texts of the plurality of erroneous pairs of discrete series of texts according to the likelihood of being based an erroneous relationship with noise;
rank said each erroneous pair of discrete series of texts according to the quality-score;
generate, based on the plurality of erroneous pairs of discrete series of texts, second training data by removing at least the ranked said each erroneous pair of discrete series of texts for learning according to the quality-score; and
update the forward learning model as iterative training of the forward learning model using second training data.

16. The computer-readable non-transitory recording medium of claim 15, the computer-executable instructions when executed further causing the system to:
convert, using a neural network, one or more discrete symbols in the third discrete series of input data of the erroneous pair of discrete series of texts into one or more fixed-length vectors;
generate a fixed-length vector series based on encoding the converted one or more fixed-length vectors of the one or more discrete symbols in the third discrete series of input data;
determine, based on the generated fixed-length vector series, a hidden vector;
generate, based on the third discrete series of input data using the hidden vector, a fifth discrete series of output data;
determine, using a negative log-likelihood of the generated fifth discrete series of output data associated with the generated fixed-length vector series, the quality-score for the fourth discrete series of output data; and provide the quality-score for excluding, based on the quality-score, the erroneous pair of discrete series of texts for training the forward learning model.

17. The computer-readable non-transitory recording medium of claim 15, the computer-executable instructions when executed further causing the system to:
   determine a plurality of quality-scores for the plurality of erroneous pairs; and
   select, based on a descending order of the determined plurality of quality-scores, a predetermined number of the erroneous pairs of discrete series of texts from the plurality of erroneous pairs of discrete series of texts.

18. The computer-readable non-transitory recording medium of claim 15, the computer-executable instructions when executed further causing the system to:
   generate, based on training, a reverse learning model for converting the second discrete model of input data into the first discrete series of output data; and
   determine, using both of the generated forward learning model and the generated reverse learning model, the quality-score for the erroneous pair of discrete series of texts.

19. The computer-readable non-transitory recording medium of claim 15, wherein the first discrete series of input data is based on a first language, wherein the second discrete series of output data is based on a second language, and the first language and the second language are distinct.

20. The computer-readable non-transitory recording medium of claim 16, wherein the quality-score for the fourth discrete series of output data relates to a negative log-likelihood per discrete symbol, and wherein the negative log-likelihood per discrete symbol is based on dividing the negative log-likelihood of the generated fifth discrete series of output data by a number of discrete symbols included in the generated fifth discrete series of output data.

* * * * *